United States Patent
Hannemann et al.

(10) Patent No.: US 6,408,612 B2
(45) Date of Patent: Jun. 25, 2002

(54) GAS AND STEAM-TURBINE PLANT

(75) Inventors: Frank Hannemann, Spardorf; Ulrich Schiffers, Eckental, both of (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/761,238

(22) Filed: Jan. 17, 2001

Related U.S. Application Data

(63) Continuation of application No. PCT/DE99/02058, filed on Jul. 2, 1999.

(30) Foreign Application Priority Data

Jul. 17, 1998 (DE) ......................................... 198 32 294

(51) Int. Cl.$^7$ ................................................. F02C 6/18
(52) U.S. Cl. .................................. 60/39.12; 60/39.182
(58) Field of Search .......................... 60/39.12, 39.182, 60/39.75

(56) References Cited

U.S. PATENT DOCUMENTS 4,677,829 A  7/1987  Archer et al.
4,697,415 A  10/1987 Schiffers

FOREIGN PATENT DOCUMENTS

DE  3331152 A1  3/1985
GB  2234984 A   2/1991

Primary Examiner—Louis J. Casaregola
(74) Attorney, Agent, or Firm—Laurence A. Greenberg; Werner H. Stemer; Ralph E. Locher

(57) ABSTRACT

A gas and steam-turbine plant includes a heat-recovery steam generator which is connected downstream of a gas turbine on the flue-gas side and has heating surfaces connected in a water/steam circuit of a steam turbine. A gasifier is connected upstream of a combustion chamber of the gas turbine for integrated gasification of a fossil fuel. Oxygen can be fed to the gasifier from an air-separation unit, to which in turn a partial flow of air compressed in an air compressor associated with the gas turbine can be admitted on the inlet side. In such a gas and steam-turbine plant, reliable cooling of the bleed air, in an especially simple type of construction, is to be ensured in all operating states, irrespective of the integration concept which is taken as a basis. Therefore, a heat exchanger for cooling the partial flow of compressed air is connected on the primary side in a bleed-air line connecting the air compressor to the air-separation unit. The heat exchanger is constructed on the secondary side as an evaporator for a flow medium.

7 Claims, 2 Drawing Sheets

GAS AND STEAM-TURBINE PLANT

CROSS-REFERENCE TO RELATED APPLICATION

This application is a continuation of copending International Application No. PCT/DE99/02058, filed Jul. 2, 1999, which designated the United States.

BACKGROUND OF THE INVENTION

Field of the Invention

The invention relates to a gas and steam-turbine plant having a heat-recovery steam generator, which is connected downstream of a gas turbine on the flue-gas side and which has heating surfaces that are connected in a water/steam circuit of a steam turbine. A gasifier for fuel is connected upstream of a combustion chamber of the gas turbine.

A gas and steam-turbine plant having integrated gasification of fossil fuel normally includes a gasifier for the fuel. That gasifier is connected on the outlet side to the combustion chamber of the gas turbine through a number of components provided for gas cleaning. In that case, a heat-recovery steam generator has heating surfaces connected in the water/steam circuit of the steam turbine and may be connected downstream of the gas turbine on the flue-gas side. Such a plant has been disclosed, for example, by UK Patent Application GB 2 234 984 A.

Furthermore, German Published, Non-Prosecuted Patent Application DE 33 31 152 A1 discloses a method of operating a gas-turbine plant having a fuel-gasification plant. In that method, low-oxygen air collecting in an air-separation unit is admixed to fuel of medium calorific value delivered to the fuel-gasification plant and the fuel/air mixture of low calorific value is fed to a combustion chamber of the gas-turbine plant. In that case, the compressor of the gas-turbine plant, in addition to supplying the combustion chamber with air, also supplies the air-separation unit with air. It is known from U.S. Pat. No. 4,677,829 and U.S. Pat. No. 4,697,415 to cool compressed air from an air compressor through the use of heat exchangers.

A device for removing sulphurous constituents is provided in that plant in order to provide reliable cleaning of the gasified fossil fuel. A saturator is connected downstream of that device in a feed line, opening into the combustion chamber, for the gasified fuel. The gasified fuel is loaded with steam in the saturator in order to reduce pollutant emission. To that end, the gasified fuel flows through the saturator in counterflow to a water flow, which is directed in a water circuit referred to as a saturator circuit. In order to provide an especially high efficiency, provision is made for an input of heat from the water/steam circuit into the saturator circuit.

In addition to the fossil fuel, oxygen required for the gasification of the fuel can also be fed to the gasifier of such a gas and steam-turbine plant. In order to obtain that oxygen from air, an air-separation unit is normally connected upstream of the gasifier. In that case, a partial flow, also referred to as bleed air, of air compressed in an air compressor associated with the gas turbine, may be admitted to the air-separation unit.

As a result of the compression process, the air flowing off from the compressor has a comparatively high temperature level. Cooling of the partial flow of the compressed air, also referred to as bleed air, is therefore normally necessary before it enters the air-separation unit. The heat extracted from the bleed air in the process is normally transferred to the saturator circuit for heat recovery and thus for achieving a high plant efficiency. Depending on the operating state of the plant, only residual cooling of the bleed air through the use of cooling water before it enters the air-separation unit is then necessary in such a structure.

However, such a concept for cooling the bleed air assumes that the heat supply during the air cooling and the heat demand in the saturator circuit are matched to one another in a sufficiently effective manner. Depending on the integration concept, that is depending on the type of air supply for the air-separation unit and the components used in the process, such bleed-air cooling therefore cannot be used universally and is only reliable to a limited extent in some operating states of the gas and steam-turbine plant.

SUMMARY OF THE INVENTION

It is accordingly an object of the invention to provide a gas and steam-turbine plant, which overcomes the hereinafore-mentioned disadvantages of the heretofore-known devices of this general type and in which, irrespective of an integration concept taken as a basis, reliable cooling of bleed air, in an especially simple type of construction, is ensured in all operating states.

With the foregoing and other objects in view there is provided, in accordance with the invention, a gas and steam-turbine plant, comprising a steam turbine having a water/steam circuit, a gas turbine having a flue-gas side, a combustion chamber associated with the gas turbine, an air compressor associated with the gas turbine for supplying a partial flow of air compressed in the air compressor, and a bleed-air line connected to the air compressor. An air-separation unit supplying oxygen and having an inlet side connected to the bleed-air line receives the partial flow of air compressed in the air compressor. A heat-recovery steam generator is connected downstream of the gas turbine on the flue-gas side. The steam generator has heating surfaces connected in the water/steam circuit. A gasifier for fuel is connected upstream of the combustion chamber and receives oxygen from the air-separation unit. A heat exchanger is constructed as an evaporative cooler for cooling the partial flow of compressed air. The heat exchanger has a primary side connected to the bleed-air line and a secondary side connected to a water/steam drum to form an evaporator circuit for a flow medium.

The invention is thus based on the concept that, for bleed-air cooling which can be used irrespective of the integration concept and the fuel to be gasified and is reliable in all operating states, the heat extracted from the bleed air should be capable of being drawn off irrespective of a firmly preset heat demand. The bleed-air cooling should therefore be isolated from the heat supply into the saturator circuit. The bleed air is instead cooled by heat exchange with a flow medium. In this case, evaporation of the flow medium is provided for especially high operational stability in a simple type of construction and for favorable input of the heat extracted from the bleed air into the plant process.

In accordance with another feature of the invention, in order to provide especially flexible bleed-air cooling which can be adapted to various operating states in a simple manner, a further heat exchanger, constructed on the secondary side as an evaporator for a flow medium, is connected downstream of the heat exchanger in the air-bleed line. The heat exchanger is constructed as an intermediate-pressure evaporator and the further heat exchanger is constructed as a low-pressure evaporator.

The heat exchanger constructed as an intermediate-pressure evaporator is expediently connected on the flow-medium side to a heating surface, associated with an intermediate-pressure stage of the steam turbine, in the heat-recovery steam generator. In an analogous configuration, the heat exchanger constructed as a low-pressure evaporator may be connected on the flow-medium side to a heating surface, associated with a low-pressure stage of the steam turbine, in the heat-recovery steam generator. However, the heat exchanger constructed as a low-pressure evaporator is expediently connected on the flow-medium side to a secondary steam consumer, for example to the gasifier or to a gas-processing system connected downstream of the latter. In such a configuration, reliable feeding of the secondary consumer with process steam or with heating steam is ensured in an especially simple manner.

In accordance with a further feature of the invention, at least one of the heat exchangers is connected on the secondary side to a water/steam drum in order to form an evaporator circuit.

In this case, the evaporator circuit may be constructed with forced circulation. However, in an especially advantageous development, the respective evaporator circulation is constructed with natural circulation. Circulation of the flow medium is ensured by pressure differences occurring during the evaporation process and/or by a geodetic configuration of the evaporator and the water/steam drum. In such a configuration, only a circulating pump with a comparatively low rating is required for starting the evaporator circulation. In accordance with an added feature of the invention, the respective water/steam drum is expediently connected to a number of heating surfaces disposed in the heat-recovery steam generator.

In accordance with an additional feature of the invention, there is provided an additional heat exchanger connected downstream of the heat exchanger in the bleed-air line. The additional heat exchanger is connected on the secondary side to a feedwater tank associated with the heat-recovery steam generator. With such a configuration, an especially favorable input of heat into the saturator circuit can be achieved, with the input of heat being independent of the integration concept. This is because, in this case, the input of heat into the saturator circuit can be effected through a heat exchanger, through which preheated feedwater extracted from the feedwater tank can flow on the primary side. The feedwater leaving this heat exchanger and cooled down by the input of heat into the saturator circuit can then be fed to the additional heat exchanger connected in the bleed-air line, where it heats up again due to the further cooling of the bleed air. An input of heat into the saturator circuit can therefore be achieved without greater heat losses in the feedwater.

In accordance with a concomitant feature of the invention, there is provided a cooling-air line which branches off from the bleed-air line downstream of the heat exchanger or downstream of the heat exchangers, as viewed in the direction of flow of the partial flow, for reliable cooling of blades of the gas turbine. A partial quantity of the cooled partial flow can be fed through the cooling-air line to the gas turbine as cooling air in order to cool the blades.

The advantages achieved with the invention reside in particular in the fact that a flexible adaptation of the gas and steam-turbine plant to different integration concepts while achieving an especially high plant efficiency is made possible by the cooling of the bleed air in a number of heat exchangers constructed as evaporators for a flow medium. In this case, the extraction of heat from the bleed air through the heat exchanger constructed as an evaporator is independent of the input of heat into the saturator circuit. The gas and steam-turbine plant can therefore be used in an especially reliable manner even in various operating states. Furthermore, the structure of the respective heat exchanger as an evaporator permits an especially simple supply of secondary consumers with process steam or with heating steam. In particular, the gasifier or a gas-processing component connected downstream of the latter is suitable as such a secondary consumer. In this case, due to the comparatively high storage capacity of the respective evaporator circuit, even fluctuating tapped quantities of process steam or heating steam by the respective secondary consumers do not lead to operational malfunctions.

Other features which are considered as characteristic for the invention are set forth in the appended claims.

Although the invention is illustrated and described herein as embodied in a gas and steam-turbine plant, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1A:
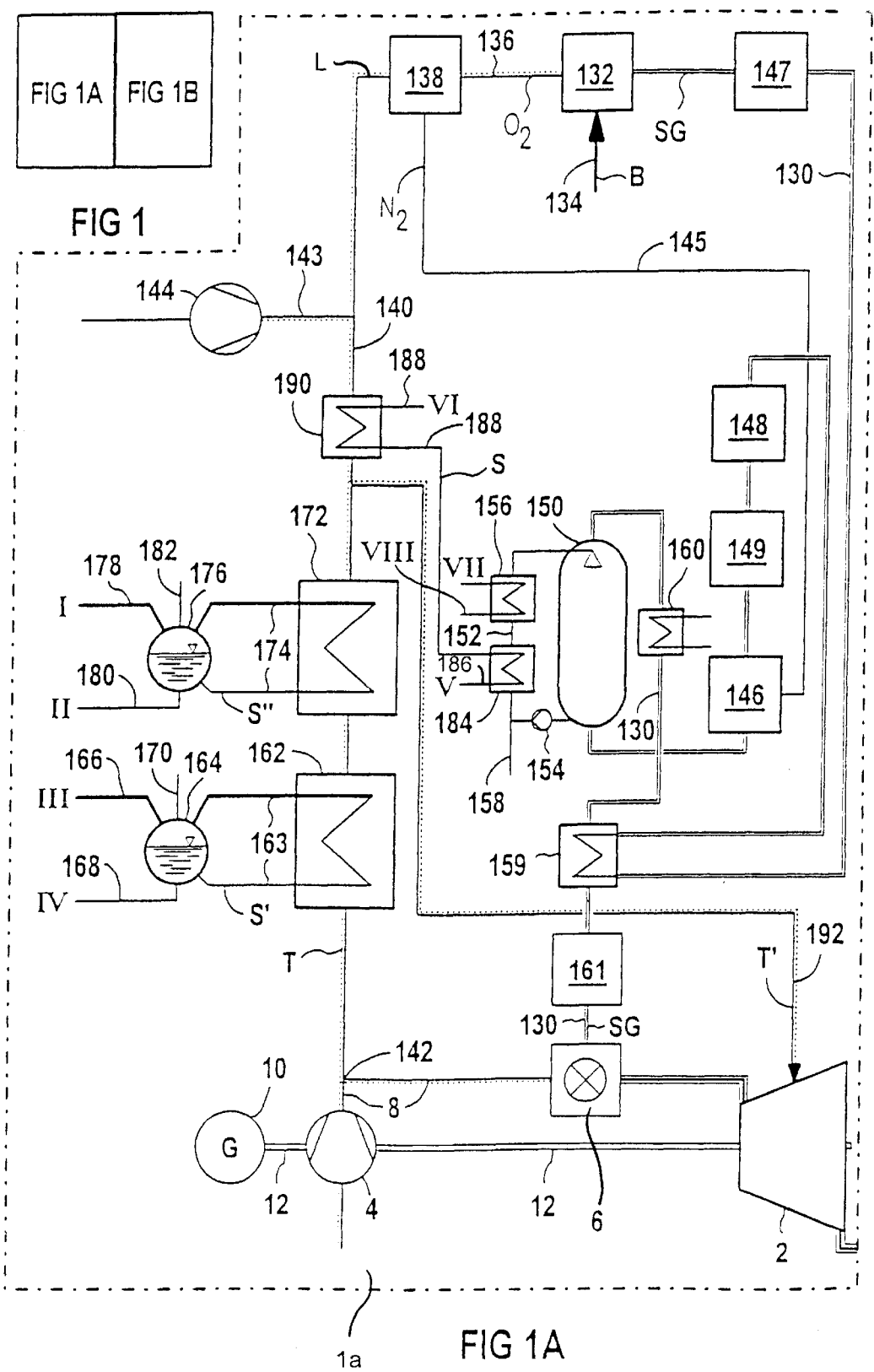
FIGS. 1A and 1B are respective left and right halves of a schematic and block diagram of a gas and steam-turbine plant according to the invention, in which roman numerals I–VIII indicate connections between the figures that are described below.
Figure 1B:
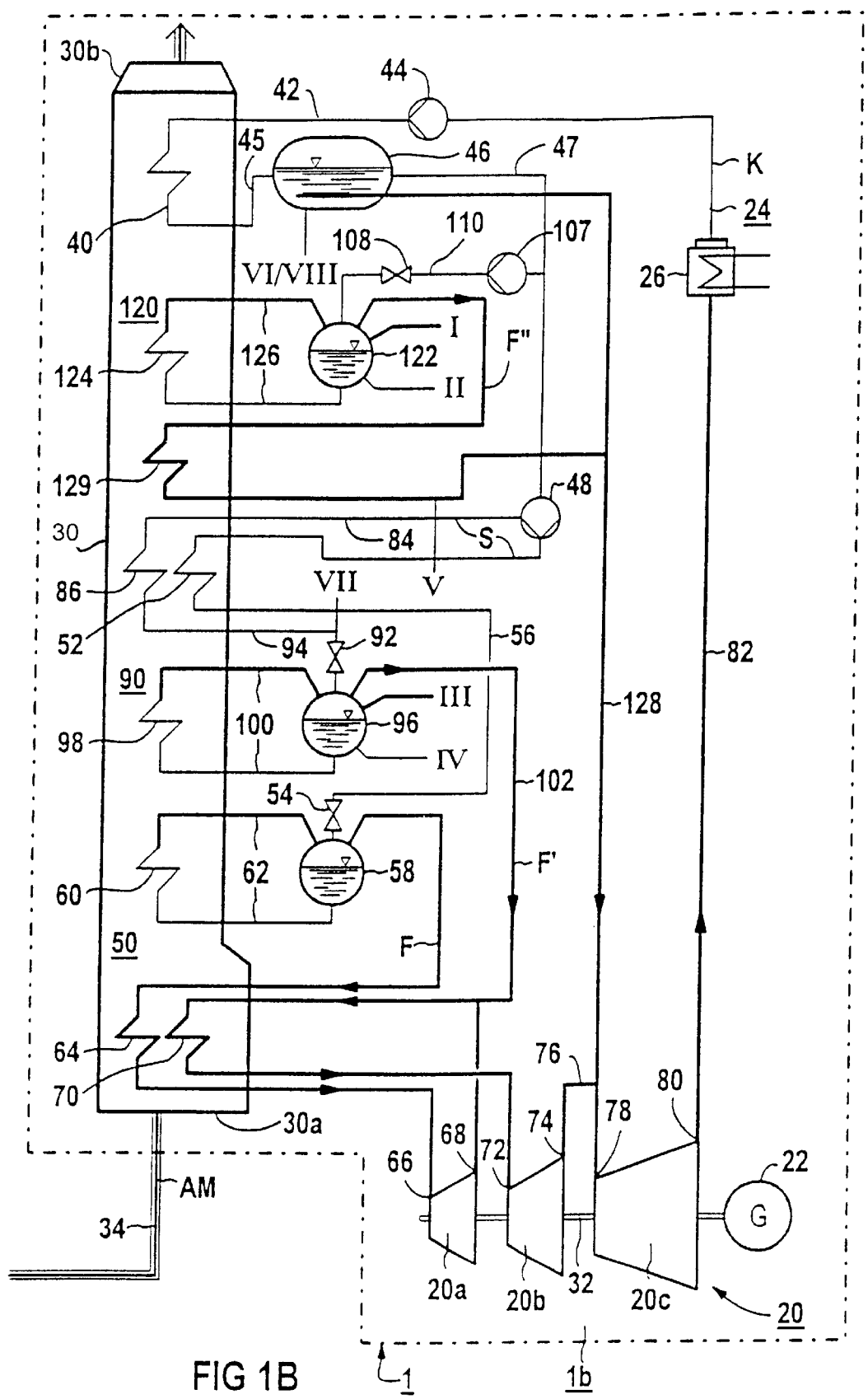

Referring now in detail to the single FIGURE of the drawing, there is seen a gas and steam-turbine plant 1 which includes a gas-turbine plant 1a and a steam-turbine plant 1b. The gas-turbine plant 1a includes a gas turbine 2 with a coupled air compressor 4 and a combustion chamber 6, which is disposed upstream of the gas turbine 2 and is connected to a compressed-air line 8 of the compressor 4. The gas turbine 2 and the air compressor 4 as well as a generator 10 sit on a common shaft 12.

The steam-turbine plant 1b includes a steam turbine 20 with a coupled generator 22. The steam-turbine plant 1b also includes a condenser 26 disposed downstream of the steam turbine 20 as well as a heat-recovery steam generator 30, in a water/steam circuit 24. The steam turbine 20 is formed of a first pressure stage or high-pressure part 20a, a second pressure stage or intermediate-pressure part 20b as well as a third pressure stage or a low-pressure part 20c, which drive the generator 22 through a common shaft 32.

An exhaust-gas line 34 is connected to an inlet 30a of the heat-recovery steam generator 30, in order to feed working medium AM expanded in the gas turbine 2, or flue gas, into the heat-recovery steam generator 30. The expanded working medium AM from the gas turbine 2 leaves the heat-recovery steam generator 30 through an outlet 30b in the direction of a non-illustrated stack.

The heat-recovery steam generator 30 includes a condensate preheater 40, which can be fed on the inlet side with condensate K from the condenser 26 through a condensate line 42, in which a condensate pump unit 44 is connected. The condensate preheater 40 is connected on the outlet side through a line 45 to a feedwater tank 46. In addition, in order to bypass the condensate preheater 40 as and when required, the condensate line 42 may be connected directly to the feedwater tank 46 through a non-illustrated bypass line. The feedwater tank 46 is connected through a line 47 to a high-pressure feed pump 48 having intermediate-pressure extraction.

The high-pressure feed pump 48 brings feedwater S flowing off from the feedwater tank 46 to a pressure level suitable for a high-pressure stage 50 of the water/steam circuit 24. The high-pressure stage 50 is associated with the high-pressure part 20a of the steam turbine 20. The feedwater S under high pressure can be fed to the high-pressure stage 50 through a feedwater preheater 52. A feedwater line 56, which can be shut off with a valve 54, connects the outlet side of the feedwater preheater 52 to a high-pressure drum 58. The high-pressure drum 58 is connected to a high-pressure evaporator 60 disposed in the heat-recovery steam generator 30, in order to form a water/steam circuit 62. The high-pressure drum 58 is connected to a high-pressure superheater 64 in order to draw off live steam F. The high-pressure superheater 64 is disposed in the heat-recovery steam generator 30 and is connected on the outlet side to a steam inlet 66 of the high-pressure part 20a of the steam turbine 20.

A steam outlet 68 of the high-pressure part 20a of the steam turbine 20 is connected through a reheater 70 to a steam inlet 72 of the intermediate-pressure part 20b of the steam turbine 20. A steam outlet 74 of the intermediate-pressure part 20b is connected through an overflow line 76 to a steam inlet 78 of the low-pressure part 20c of the steam turbine 20. A steam outlet 80 of the low-pressure part 20c of the steam turbine 20 is connected through a steam line 82 to the condenser 26, so that the closed water/steam circuit 24 results.

In addition, a branch line 84 branches off from the high-pressure pump 48 at an extraction point at which the condensate K reaches an intermediate pressure. The branch line 84 is connected through a further feedwater preheater or intermediate-pressure economizer 86 to an intermediate-pressure stage 90, which is associated with the intermediate-pressure part 20b of the steam turbine 20 of the water/steam circuit. To this end, a feedwater line 94, which can be shut off with a valve 92, connects the outlet side of the further feedwater preheater 86 to an intermediate-pressure drum 96 of the intermediate-pressure stage 90. The intermediate-pressure drum 96 is connected to a heating surface 98 disposed in the heat-recovery steam generator 30 and constructed as an intermediate-pressure evaporator, in order to form a water/steam circuit 100. In order to draw off intermediate-pressure live steam F', the intermediate-pressure drum 96 is connected through a steam line 102 to the reheater 70 and thus to the steam inlet 72 of the intermediate-pressure part 20b of the steam turbine 20.

A further line 110 which branches off from the line 47 and is provided with a low-pressure feed pump 107, can be shut off with a valve 108 and is connected to a low-pressure stage 120 of the water/steam circuit 24. The low-pressure stage 120 is associated with the low-pressure part 20c of the steam turbine 20. The low-pressure stage 120 includes a low-pressure drum 122, which is connected to a heating surface 124 disposed in the heat-recovery steam generator 30 and is constructed as a low-pressure evaporator, in order to form a water/steam circuit 126. In order to draw off low-pressure live steam F'', the low-pressure drum 122 is connected through a steam line 128 to the overflow line 76. A low-pressure superheater 129 is connected in the steam line 128. Therefore, the water/steam circuit 24 of the gas and steam-turbine plant 1 includes three pressure stages 50, 90, 120 in the exemplary embodiment. Alternatively, however, fewer, in particular two, pressure stages may be provided.

The gas-turbine plant 1a is constructed for operation with a gasified synthetic gas SG, which is produced by the gasification of a fossil fuel B. For example, gasified coal or gasified oil may be provided as the synthetic gas. To this end, the combustion chamber 6 of the gas turbine 2 is connected on the inlet side through a fuel line 130 to a gasifier 132. Coal or oil can be fed through a feed system 134 to the gasifier 132, as fossil fuel B.

In order to provide oxygen $O_2$ required for the gasification of the fossil fuel B, an air-separation unit 138 is connected upstream of the gasifier 132, through an oxygen line 136. A partial flow T of the air compressed in the air compressor 4 can be admitted to the air-separation unit 138 on the inlet side. To this end, the air-separation unit 138 is connected on the inlet side to a bleed-air line 140, which branches off from the compressed-air line 8 at a branch point 142. In addition, a further air line 143, in which an additional air compressor 144 is connected, opens into the bleed-air line 140. Therefore, in the exemplary embodiment, a total air flow L flowing to the air-separation unit 138 is composed of the partial flow T branched off from the compressed-air line 8 and the air flow delivered by the additional air compressor 144. Such a circuit concept is also referred to as a partly integrated plant concept. In an alternative configuration, a so-called fully integrated plant concept, the further air line 143 together with the additional air compressor 144 may also be omitted. In that way, the feeding of the air-separation unit 138 with air is effected completely through the partial flow T bled from the compressed-air line 8.

Nitrogen $N_2$ which is obtained in the air-separation unit 138 in addition to the oxygen $O_2$ during the separation of the air flow L is fed through a nitrogen line 145 connected to the air-separation unit 138 to a mixing device 146 and is admixed there to the synthetic gas SG. In this case, the mixing device 146 is constructed for especially uniform and strand-free mixing of the nitrogen $N_2$ with the synthetic gas SG.

The synthetic gas SG flowing off from the gasifier 132 passes through the fuel line 130 and first of all into a crude-gas heat-recovery steam generator 147, in which the synthetic gas SG is cooled down by heat exchange with a flow medium. High-pressure steam generated during this heat exchange is fed to the high-pressure stage 50 of the water/steam circuit 24 in a non-illustrated manner.

A deduster 148 for the synthetic gas SG and a desulphurization unit 149 are connected in the fuel line 130 downstream of the crude-gas heat-recovery steam generator 147 and upstream of the mixing device 146, as viewed in the direction of flow of the synthetic gas SG. In an alternative configuration, a soot scrubber may also be provided instead of the deduster 148, in particular during gasification of oil as fuel.

In order to provide an especially low pollutant emission during the combustion of the gasified fuel in the combustion chamber 6, provision is made for loading the gasified fuel with steam before entry into the combustion chamber 6. This may be effected in an especially advantageous manner in a saturator system, from a thermal point of view. To this end, a saturator 150, in which the gasified fuel is directed in counterflow to heated saturator water, is connected in the fuel line 130. In this case, the saturator water circulates in a saturator circuit 152, which is connected to the saturator 150 and in which a circulating pump 154 and a heat exchanger 156 for the preheating of the saturator water, are connected. In this case, preheated feedwater from the intermediate-pressure stage 90 of the water/steam circuit 24 is admitted to the heat exchanger 156 on the primary side. A feeder line 158 is connected to the saturator circuit 152 in order to compensate for losses of saturator water which occur during the saturation of the gasified fuel.

A heat exchanger 159, acting as a crude-gas/pure-gas heat exchanger, is connected downstream of the saturator 150 in the fuel line 130 on the secondary side, as viewed in the direction of flow of the synthetic gas SG. In this case, the heat exchanger 159 is likewise connected in the fuel line 130 on the primary side at a point upstream of the deduster 148, so that the synthetic gas SG flowing to the deduster 148 transfers some of its heat to the synthetic gas SG flowing off from the saturator 150. The directing of the synthetic gas SG through the heat exchanger 159 before entry into the desulphurization unit 149 may also be provided in a circuit concept which is modified with regard to the other components.

A further heat exchanger 160 is connected between the saturator 150 and the heat exchanger 159 in the fuel line 130 on the secondary side. The further heat exchanger 160 may be heated on the primary side by feedwater or by steam. In this case, even during different operating states of the gas and steam-turbine plant 1, the heat exchanger 159, which is constructed as crude-gas/pure-gas heat exchanger, and the heat exchanger 160, ensure especially reliable preheating of the synthetic gas SG flowing to the combustion chamber 6 of the gas turbine 2.

A further mixing device 161 is also connected in the fuel line 130 in order to admit steam as and when required to the synthetic gas SG flowing to the combustion chamber 6. Intermediate-pressure steam can be fed through a non-illustrated steam line to the further mixing device 161, in particular in order to ensure reliable gas-turbine operation in the event of operational malfunctions.

In order to cool the partial flow T of compressed air or so-called bleed air to be fed to the air-separation unit 138, a first heat exchanger 162, which is constructed on the secondary side as an intermediate-pressure evaporator for a flow medium S', is connected in the bleed-air line 140 on the primary side. In order to form an evaporator circuit 163, the heat exchanger 162 is connected to a water/steam drum 164 that is constructed as an intermediate-pressure drum. The water/steam drum 164 is connected through lines 166, 168 to the intermediate-pressure drum 96 assigned to the water/steam circuit 100. Alternatively, however, the heat exchanger 162 may also be connected on the secondary side directly to the intermediate-pressure drum 96. Therefore, the water/steam drum 164 is connected indirectly to the heating surface 98 which is constructed as an intermediate-pressure evaporator, in the exemplary embodiment. In addition, a feedwater line 170 is connected to the water/steam drum 164 for the subsequent feeding of evaporated flow medium S'.

A second heat exchanger 172 is connected downstream of the heat exchanger 162 in the bleed-air line 140, as viewed in the direction of flow of the partial flow T of compressed air. This second heat exchanger 172 is constructed on the secondary side as a low-pressure evaporator for a flow medium S". In this case, the heat exchanger 172 is connected to a water/steam drum 176 that is constructed as a low-pressure drum, in order to form an evaporator circuit 174. In the exemplary embodiment, the water/steam drum 176 is connected through lines 178, 180 to the low-pressure drum 122 associated with the water/steam circuit 126 and is therefore indirectly connected to the heating surface 124 which is constructed as a low-pressure evaporator. Alternatively, the water/steam drum 176 may also be connected in another suitable manner, in which case steam bled from the water/steam drum 176 can be fed to a secondary consumer as process steam and/or as heating steam. In a further alternative configuration, the heat exchanger 172 may also be connected on the secondary side directly to the low-pressure drum 122. In addition, the water/steam drum 176 is connected to a feedwater line 182.

The evaporator circuits 163, 174 could each be constructed with forced circulation. In that way the circulation of the flow medium S' and S" would be respectively ensured by a circulating pump, and the flow medium S', S" would be at least partly evaporated in the heat exchanger 162 or 172 that is respectively constructed as an evaporator. In the exemplary embodiment, however, both the evaporator circuit 163 and the evaporator circuit 174 are each constructed for natural circulation. The circulation of the flow medium S' or S" is respectively ensured by pressure differences occurring during the evaporation process and/or by a geodetic configuration of the respective heat exchanger 162 or 172 and the respective water/steam drum 164 or 176. In this configuration, in each case only a non-illustrated circulating pump with a comparatively low rating for starting the system is connected in the evaporator circuit 163 or in the evaporator circuit 174, respectively.

In order to provide for the input of heat into the saturator circuit 152, a saturator-water heat exchanger 184 is provided in addition to the heat exchanger 156 to which heated feedwater branched off downstream of the feedwater preheater 86 can be admitted. Feedwater S can be admitted to the saturator-water heat exchanger 184 on the primary side from the feedwater tank 46. To this end, the primary side of the saturator-water heat exchanger 184 is connected on the inlet side through a line 186 to the branch line 84 and on the outlet side through a line 188 to the feedwater tank 46. In order to reheat the cooled feedwater S flowing off from the saturator-water heat exchanger 184, an additional or second heat exchanger 190 is connected in the line 188. This heat exchanger 190 is connected on the primary side downstream of the heat exchanger 172 in the bleed-air line 140. Especially high heat recovery from the bleed air and thus an especially high efficiency of the gas and steam-turbine plant 1 can be achieved by such a configuration.

A cooling-air line 192 branches off from the bleed-air line 140 between the heat exchanger 172 and the heat exchanger 190, as viewed in the direction of flow of the partial flow T. A partial quantity T' of the cooled partial flow T can be fed through the cooling-air line 192 as cooling air to the gas turbine 2 in order to cool the blades.

Due to the structure of the respective heat exchangers 162 and 172 as an intermediate-pressure evaporator and a low-pressure evaporator, reliable cooling of the bleed air is ensured even during various operating states of the gas and steam-turbine plant 1 and even in the case of different integration concepts for the gasification of the fossil fuel B. The concept of the bleed-air cooling by connecting the heat exchangers 162 and 172, constructed as evaporator coolers, in the bleed-air line 140, is therefore also especially suitable for various fossil fuels B. In particular, due to the multiplicity of adjustable steam parameters in the evaporator circuits 163 and 174, such bleed-air cooling can be adapted in an especially flexible manner to various requirements during the operation of the gas and steam-turbine plant 1.

We claim:

1. A gas and steam-turbine plant, comprising:
   a steam turbine having a water/steam circuit;
   a gas turbine having a flue-gas side;
   a combustion chamber associated with said gas turbine;
   an air compressor associated with said gas turbine for supplying a partial flow of air compressed in said air compressor;
   a bleed-air line connected to said air compressor;
   an air-separation unit supplying oxygen and having an inlet side connected to said bleed-air line for receiving said partial flow of air compressed in said air compressor;
   a heat-recovery steam generator connected downstream of said gas turbine on said flue-gas side, said steam generator having heating surfaces connected in said water/steam circuit;
   a gasifier for fuel, said gasifier connected upstream of said combustion chamber and receiving oxygen from said air-separation unit;
   a water/steam drum; and
   a heat exchanger constructed as an evaporative cooler for cooling said partial flow of compressed air, said heat exchanger having a primary side connected to said bleed-air line and a secondary side connected to said water/steam drum to form an evaporator circuit for a flow medium.

2. The gas and steam-turbine plant according to claim 1, wherein said heat exchanger is a first heat exchanger and is constructed as a first evaporator, a second heat exchanger has a secondary side constructed as an evaporator for a flow medium and is connected to said bleed-air line downstream of said first heat exchanger, and said second heat exchanger is constructed as a second, relatively low-pressure evaporator.

3. The gas and steam-turbine plant according to claim 2, including another water/steam drum, said second heat exchanger having a secondary side connected to said other water/steam drum to form an evaporator circuit.

4. The gas and steam-turbine plant according to claim 3, wherein at least one of said water/steam drums is connected to a number of said heating surfaces of said heat-recovery steam generator.

5. The gas and steam-turbine plant according to claim 1, wherein said heat exchanger is a first heat exchanger, a feedwater tank is associated with said heat-recovery steam generator, a second heat exchanger is connected to said bleed-air line downstream of said first heat exchanger, and said second heat exchanger has a secondary side connected to said feedwater tank.

6. The gas and steam-turbine plant according claim 1, including a cooling-air line branching off from said bleed-air line downstream of said heat exchanger in a direction of flow of said partial flow of air compressed in said air compressor, said cooling-air line feeding a partial quantity of a cooled partial flow as cooling air to said gas turbine for cooling blades of said gas turbine.

7. The gas and steam-turbine plant according claim 2, including a cooling-air line branching off from said bleed-air line downstream of said first and second heat exchangers in a direction of flow of said partial flow of air compressed in said air compressor, said cooling-air line feeding a partial quantity of a cooled partial flow as cooling air to said gas turbine for cooling blades of said gas turbine.

\* \* \* \* \*